(12) United States Patent
Um et al.

(10) Patent No.: US 7,573,610 B2
(45) Date of Patent: Aug. 11, 2009

(54) INTELLIGENT COLOR GAMUT MANAGEMENT METHOD

(75) Inventors: Jin-sub Um, Suwon-si (KR); Moon-cheol Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 491 days.

(21) Appl. No.: 11/390,130

(22) Filed: Mar. 28, 2006

(65) Prior Publication Data

US 2007/0081177 A1 Apr. 12, 2007

(30) Foreign Application Priority Data

Oct. 8, 2005 (KR) .................. 10-2005-0094663

(51) Int. Cl.
G03F 3/08 (2006.01)
(52) U.S. Cl. .................. 358/1.9; 358/518; 358/519; 358/515; 345/603
(58) Field of Classification Search ............... 358/1.9, 358/518, 519, 520, 515; 382/162, 167; 345/591, 345/600, 603, 590
See application file for complete search history.

(56) References Cited

U.S. PATENT DOCUMENTS

| | | | | |
|---|---|---|---|---|
| 5,231,504 A * | 7/1993 | Magee | .................. | 358/520 |
| 6,151,136 A * | 11/2000 | Takemoto | .................. | 358/1.9 |
| 6,181,445 B1 * | 1/2001 | Lin et al. | .................. | 358/520 |
| 6,388,648 B1 * | 5/2002 | Clifton et al. | .................. | 345/601 |
| 6,560,356 B1 * | 5/2003 | Takahashi et al. | .................. | 382/162 |
| 6,882,445 B1 * | 4/2005 | Takahashi et al. | .................. | 358/1.9 |
| 7,064,864 B2 * | 6/2006 | Takahashi et al. | .................. | 358/1.9 |
| 7,116,441 B1 * | 10/2006 | Matsuoka | .................. | 358/1.9 |
| 7,184,057 B2 * | 2/2007 | Stokes et al. | .................. | 345/600 |
| 2003/0234793 A1 * | 12/2003 | Stokes et al. | .................. | 345/600 |
| 2004/0239971 A1 * | 12/2004 | Kim | .................. | 358/1.9 |
| 2005/0047654 A1 * | 3/2005 | Newman et al. | .................. | 382/167 |
| 2005/0073730 A1 * | 4/2005 | Huang et al. | .................. | 358/518 |
| 2005/0083344 A1 * | 4/2005 | Higgins | .................. | 345/600 |
| 2005/0276470 A1 * | 12/2005 | Kim et al. | .................. | 382/162 |
| 2006/0018536 A1 * | 1/2006 | Haikin et al. | .................. | 382/167 |
| 2006/0170940 A1 * | 8/2006 | Kang et al. | .................. | 358/1.9 |
| 2006/0204083 A1 * | 9/2006 | Takahashi | .................. | 382/162 |
| 2006/0274341 A1 * | 12/2006 | Kumada et al. | .................. | 358/1.9 |
| 2007/0041026 A1 * | 2/2007 | Tin | .................. | 358/1.9 |
| 2007/0070091 A1 * | 3/2007 | Cho et al. | .................. | 345/589 |
| 2007/0070368 A1 * | 3/2007 | Matsui et al. | .................. | 358/1.9 |
| 2007/0081176 A1 * | 4/2007 | Newman et al. | .................. | 358/1.9 |

(Continued)

FOREIGN PATENT DOCUMENTS

JP 10-178557 A 6/1998

(Continued)

*Primary Examiner*—Kimberly A Williams
(74) *Attorney, Agent, or Firm*—Sughrue Mion, PLLC

(57) ABSTRACT

An intelligent color gamut management method. The intelligent color gamut management method performs a saturation mapping and a luminance mapping separately according to a characteristic of a target device, thereby enabling the target device to represent a natural color image. Accordingly, it is possible to reduce color reproduction distortion of an image between different color devices having different color gamuts and also reproduce a natural color image, and also, secondary CMY colors, which vary depending on a color temperature, can be adjusted to be more natural. Since the color gamut boundary can be easily obtained, a memory capacity can be saved a freedom of algorithm can be increased.

15 Claims, 8 Drawing Sheets

Standard RGB   Display RGB

Gamut Mapping Block Diagram

U.S. PATENT DOCUMENTS

2007/0195382 A1* 8/2007 Cho et al. .................... 358/518
2007/0223018 A1* 9/2007 Lammers et al. ............. 358/1.9
2008/0095430 A1* 4/2008 Jaspers ....................... 382/167
2008/0144928 A1* 6/2008 Takahashi ................... 382/162

FOREIGN PATENT DOCUMENTS

JP        11-313219  A      11/1999

* cited by examiner

Saturation Mapping

Luminance Mapping

Gamut Mapping Block Diagram

Yellow Adjustment

Secondary Adjustment

Luminance Stretching & Compression

Saturation Gain Function

Luminance Gain Function

INTELLIGENT COLOR GAMUT MANAGEMENT METHOD

CROSS REFERENCE TO RELATED APPLICATIONS

This application claims priority under 35 U.S.C. § 119 from Korean Patent Application No. 2005-94663, filed on Oct. 8, 2005, in the Korean Intellectual Property Office, the entire content of which is incorporated herein by reference.

BACKGROUND OF THE INVENTION

1. Field of the Invention

The present invention relates to an intelligent color gamut management method and, more particularly, to an intelligent color gamut management method, which performs a saturation mapping and a luminance mapping separately according to a characteristic of a target device, which is to receive a color signal from a source device and has a different color gamut from that of the source device, thereby enabling the target device to represent a natural color image.

2. Description of the Related Art

Color reproducing devices such as monitors, scanners and printers use different color spaces or different color models depending on their respective utilization fields. For example, a color printer uses a CMY color space, a color CRT monitor or computer graphic device uses an RGB color space, and devices treating hue, saturation, and brightness use a HIS color space. Also, a CIE color space is used to define a 'device independent color' that is reproducible on any device. Representative examples of the CIE color space are CIE-XYZ, CIE L*a*b, CIE L*u*v.

The color reproducing devices may have different color gamut. The color space defines a color, i.e., defines a relationship between two different colors, whereas the color gamut defines a color reproducible range. Accordingly, if there is a discrepancy in color gamut between an incoming color signal and a color reproducing device reproducing the incoming color signal, the color reproducing device is required to perform a gamut mapping of properly converting the color signal and thus matching the different color gamuts to improve a color reproducibility.

General gamut mapping available for the different color devices converts a color space of an incoming color signal and then maps lightness and saturations without changing hues. More specifically, the color space of the incoming signal is converted from a 'device dependent color space (DDCS)' such as RGB and CMYK into a 'device independent color space (DICS)' such as CIE-XYZ and CIE-LAB. To accomplish this, the DICS is converted into LCH coordinates defined by hue, lightness, and chroma, and then a gamut mapping with respect to lightness and chroma is performed in a constant hue plane. Most frequently used gamut mappings are a method that maps chroma while maintaining lightness, and a vector mapping method that converts both lightness and chroma simultaneously. Various modified methods based on the two above-described methods are used.

The gamut mapping uses boundary information of color gamut to determine to what degree color signals match between two different color devices. Since the gamut mapping is generally performed in a constant hue plane in order to maintain constant hue, color gamut boundaries with respect to brightness and chroma are required for each color. However, in order to obtain the color gamut boundaries, a complicated calculation is required. If color gamut coordinates use a nonlinear function like CIE L*a*b and CIE L*u*v, a calculation to obtain a color gamut boundary becomes more complicated. Therefore, it is difficult to obtain color gamut boundary information in real time. Also, the color gamut boundary information is stored in a look-up table (LUT) or the gamut mapping itself is converted into 3D LUT. Accordingly, a memory for storing the LUT has to have a high storage capacity.

SUMMARY OF THE INVENTION

An aspect of the present invention is to provide an intelligent color gamut management method which performs a saturation mapping and a luminance mapping separately with respect to a color signal according to a characteristic of a target device which has a different color gamut from that of a source device, thereby enabling the target device to represent a natural color image.

The above aspect is achieved by providing an intelligent color gamut management method which converts a nonlinear color signal from a source device into a linear color signal that is reproducible by a target device. The method includes (a) converting the linear color signal into an xy color signal of an XYZ color space, (b) dividing a color signal region with respect to the xy color signal and calculating a color gamut boundary point, (c) performing a saturation mapping based on the color gamut boundary point, and (d) performing a luminance mapping based on the linear color signal and the xy color signal.

The operation (a) may convert the linear color signal into a color signal of a device independent coordinates CIE-XYZ using a 3×3 matrix, and converts the color signal of the CIE-XYZ coordinates into the xy color signal.

The operation (b) may divide the CIE-xy coordinates into three-channel regions having a white (W) region, a red (R) region, a green (G) region and a blue (B) region, or divides the CIE-xy coordinates into six-channel regions having a yellow (Y) region, a cyan (C) region and a magenta (M) region in addition to the three-channel regions.

The operation (b) may calculate a source color gamut boundary point (sbpx, sbpy) and a target color gamut boundary point (tbpx, tbpy).

The operation (c) may perform a saturation stretching if a target color gamut is larger than a source color gamut, and performs a saturation compression if the target color gamut is smaller than the source color gamut.

The intelligent color gamut management method may further include adjusting an amount of gain in order to prevent a saturation of a low saturation color from being extremely increased and being unnatural due to the saturation stretching, and adjusting an amount of gain in order to prevent a saturation of a mid-level saturation color from being decreased due to the saturation compression.

The operation of adjusting the amount of gain may use a nonlinear function or a linear function, and decrease the gain if the saturation is low and increases the gain if the saturation is high.

The operation of adjusting the gain may adjust saturations of secondary colors including yellow, cyan and magenta.

The operation (c) may obtain a mapping point (tx, ty) based on the following Equation:

$$tx = gsat * wx, \ ty = gsat * wy$$

$$gsat = \frac{\sqrt{tbpx^2 + tbpy^2}}{\sqrt{sbpx^2 + sbpy^2}}$$

wherein wx, wy are obtained by subtracting a white point from the xy color signal and gsat>1.

At the operation of (d), the luminance mapping may perform a luminance stretching if a luminance of a target color gamut is higher than that of a source color gamut and performs a luminance compression if the luminance of the source color gamut is higher than that of the target color gamut.

The intelligent color gamut management method may further include adjusting an amount of gain when the amount of low luminance colors is increased and thus a noise is increased due to the luminance stretching or when a luminance of mid-level luminance colors is decreased due to the luminance compression.

If the luminance is low, the amount of gain may be reduced, and if the luminance is high, the amount of gain may be increased.

At the operation of adjusting, luminance of secondary colors including yellow, cyan, magenta may be adjusted, and the operations of (c) and (d) may be performed with reference to a white point.

BRIEF DESCRIPTION OF THE DRAWINGS

This and/or other aspects of the present invention will become apparent and more readily appreciated from the following description of the embodiments, taken in conjunction with the accompanying drawings of which.

DETAILED DESCRIPTION OF AN EXEMPLARY, NON-LIMITING EMBODIMENT

Hereinafter, an exemplary embodiment of the present invention will now be described in greater detail with reference to the accompanying drawings. The described exemplary embodiment is intended to assist in the understanding of the invention, and is not intended to limit the invention in any way.

Figure 1A:
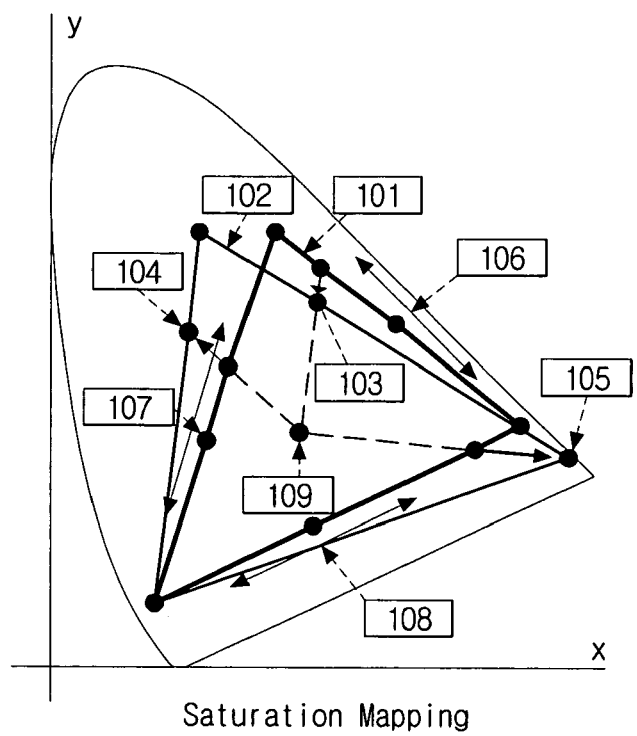
FIG. 1A is a view showing a saturation mapping in an intelligent color gamut management method according to an exemplary embodiment of the present invention.
Figure 1B:
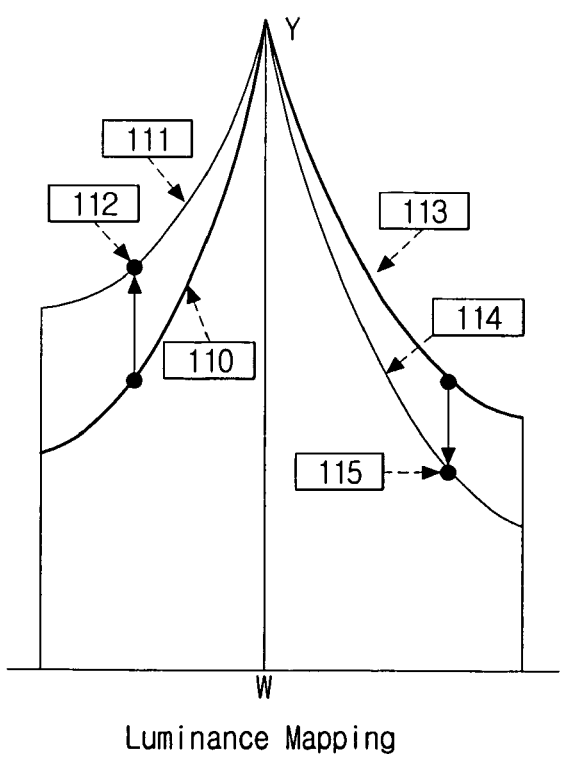
FIG. 1B is a view showing a luminance mapping in an intelligent color gamut management method according to an exemplary embodiment of the present invention.

FIGS. 1A and 1B are views illustrating a saturation mapping and a luminance mapping, respectively, of an intelligent color gamut management method according to an exemplary embodiment of the present invention.

FIG. 1A shows a source gamut saturation 101 corresponding to a broadcast signal and a target gamut saturation 102 corresponding to a display.

According to the saturation mapping, if the source gamut saturation 101 is located out of the target gamut saturation 102 with reference to a white point 109 as it is at a point 103, the source gamut saturation 101 decreases as much as an amount by which the source gamut saturation 101 mismatches the target gamut saturation 102. Also, if the target gamut saturation 102 is located out of the source gamut saturation 101 as it is at points 104 and 105, the source gamut saturation 101 increases as much as an amount by which the source gamut saturation 101 mismatches the target gamut saturation 102. In FIG. 1A, the arrows 106, 107 and 108 indicate changes in saturation to improve secondary color images such as yellow, cyan, and magenta.

FIG. 1B is a view for explaining the luminance mapping. According to the luminance mapping, if a source gamut luminance 110 is lower than a target gamut luminance 111, the source gamut luminance 110 increases as it does to a point 112, and if a source gamut luminance 113 is higher than a target gamut luminance 114, the source gamut luminance 113 decreases as it does to a point 115.

Figure 2:
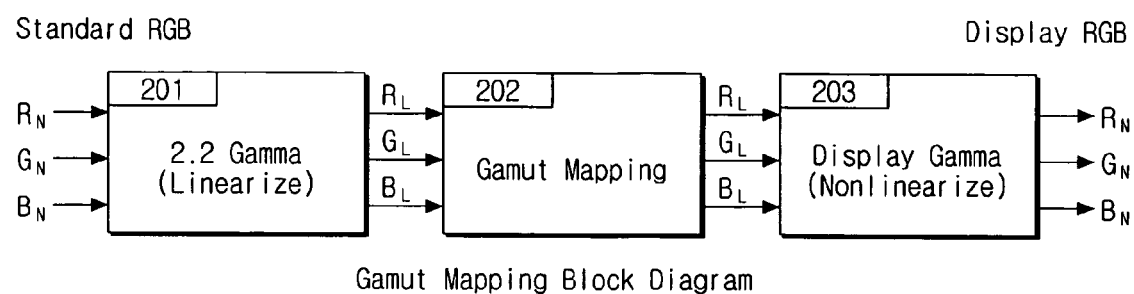
FIG. 2 is a block diagram illustrating a primary color gamut mapping device according to an exemplary embodiment of the present invention.

FIG. 2 is a block diagram illustrating a primary color gamut mapping in a color gamut management device according to an exemplary embodiment of the present invention.

As shown in FIG. 2, the primary color gamut mapping device comprises a linear adjuster 201, a color gamut mapping unit 202, and a color signal output unit 203.

The linear adjust 201 linear-adjusts an input standard non-liner $R_N G_N B_N$ color signal using a 2.2 gamma and outputs a linear $R_L G_L B_L$ color signal The color gamut mapping unit 202 performs a saturation mapping and a luminance mapping with respect to the linear $R_L G_L L_L$ color signal, which is out of gamut, as shown in FIGS. 1A and 1B.

The color signal output unit 203 outputs the nonlinear $R_N G_N B_N$ color signal which is gamma-adjusted from the linear $R_L G_L B_L$ color signal to a target device.

In other words, a color gamut management device according to an exemplary embodiment of the present invention converts the nonlinear $R_N G_N B_N$ color signal which is a standard broadcast signal input from a source device into the linear $R_L G_L B_L$ color signal using the 2.2. gamma at the linear adjuster 201. Next, the color gamut mapping unit 202 performs a gamut mapping with respect to the received linear $R_L G_L B_L$ color signal and outputs the linear $R_L G_L B_L$ color signal that is compatible with the target device. The color signal output unit 203 performs a gamma-adjustment with respect to the linear $R_L G_L B_L$ color signal and outputs the nonlinear $R_N G_N B_N$ color signal to the target device.

Figure 6:
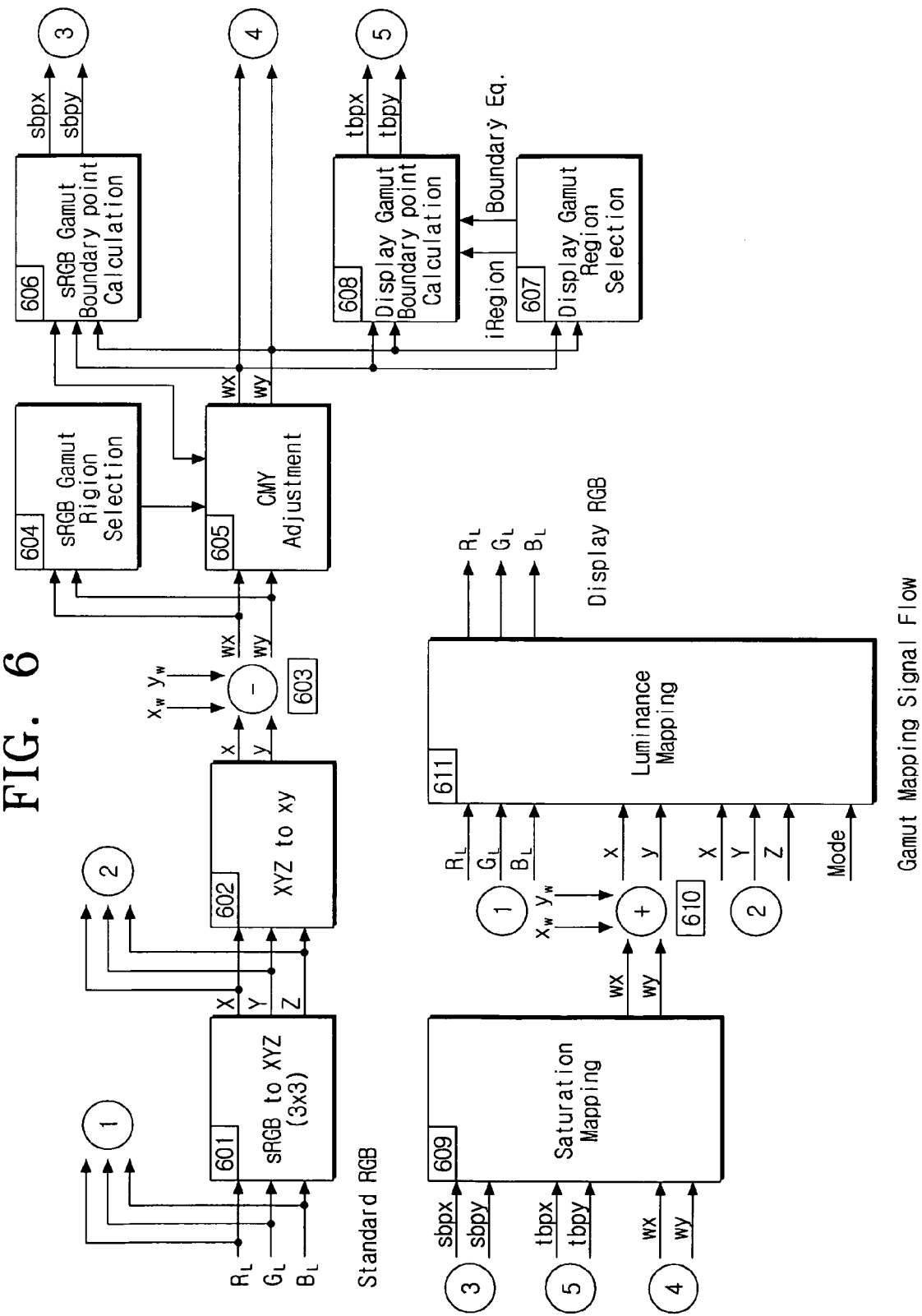
FIG. 6 is a block diagram showing an intelligent color gamut management method according to an exemplary embodiment of the present invention.

FIG. 6 is a color gamut mapping block diagram illustrating an intelligent color gamut management method according to an exemplary embodiment of the present invention.

In FIG. 6, 'sRGB' denotes a source device and 'Display' denotes a target device. The color gamut mapping block diagram comprises a first color signal converter 601, a second color signal converter 602, a first composition unit 603, a color gamut selection unit 604, a CMY adjustment unit 605, a color gamut boundary point calculator 606, a mark color gamut selection unit 607, a mark color gamut boundary point calculator 608, a saturation mapping unit 609, a second composition unit 610, and a luminance mapping unit 611.

In FIG. 6, input $R_L$, $G_L$, $B_L$ color signals have a linear RGB value. A standard broadcast signal has a gamma-adjusted nonlinear RGB value. The linear-adjuster 201 converts the nonlinear RGB value into a linear RGB value in a linearization method determined according to the source device. According to the standard 709 of ITU-R Recommendations BT series which is a broadcast standard, the gamma-adjustment is made based on the following Equation 1:

$$R' = \begin{cases} 4.5R & R < 0.018 \\ 1.099 \cdot R^{0.45} - 0.099 & R \geq 0.018 \end{cases} \quad \text{[Equation 1]}$$

In the same method, the gamma-adjustment G' and B' are calculated based on the above-described Equation 1. The linearization is performed based on the transformation of the Equation 1, i.e., the following Equation 2:

$$R = \begin{cases} \dfrac{R'}{4.5} & R p 0.081 \\ \left(\dfrac{R' + 0.099}{1.099}\right)^{1/0.45} & R \geq 0.081 \end{cases}$$

The RGB value as linearized above is input to the first color control converter 601 and converted into a CIE-XYZ coordinates which are device independent coordinates of RGB by the second color signal converter 602. The conversion of the RGB color signal into the CIE-XYZ color signal uses a 3×3 matrix as the following Equation 3 according to the standard 709 of the ITU-R recommendations BT series:

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \begin{bmatrix} R \\ G \\ B \end{bmatrix}. \quad \text{[Equation 3]}$$

Since a saturation component is needed for the saturation mapping, the second color signal converter 602 obtains a CIE-xy value from the CIE-XYZ color signal based on the following Equation 4:

$$x = \frac{X}{X+Y+Z} \quad \text{[Equation 4]}$$
$$y = \frac{Y}{X+Y+Z}$$

wherein, since the mapping is performed with reference to the white point, a value (wx, wy) is obtained by subtracting a value (xw, yw) of the white point from a value (x,y) of the first composition unit 603. Accordingly, the CIE-xy value, which is used in all the blocks from 603 to 610, is an offset value of the value (xw, yw) of the white point.

The color gamut selection unit 604 determines which region of the source device the current value (wx, wy) is located. The determination operation is performed as shown in FIGS. 3A and 3B.

Figure 3A:
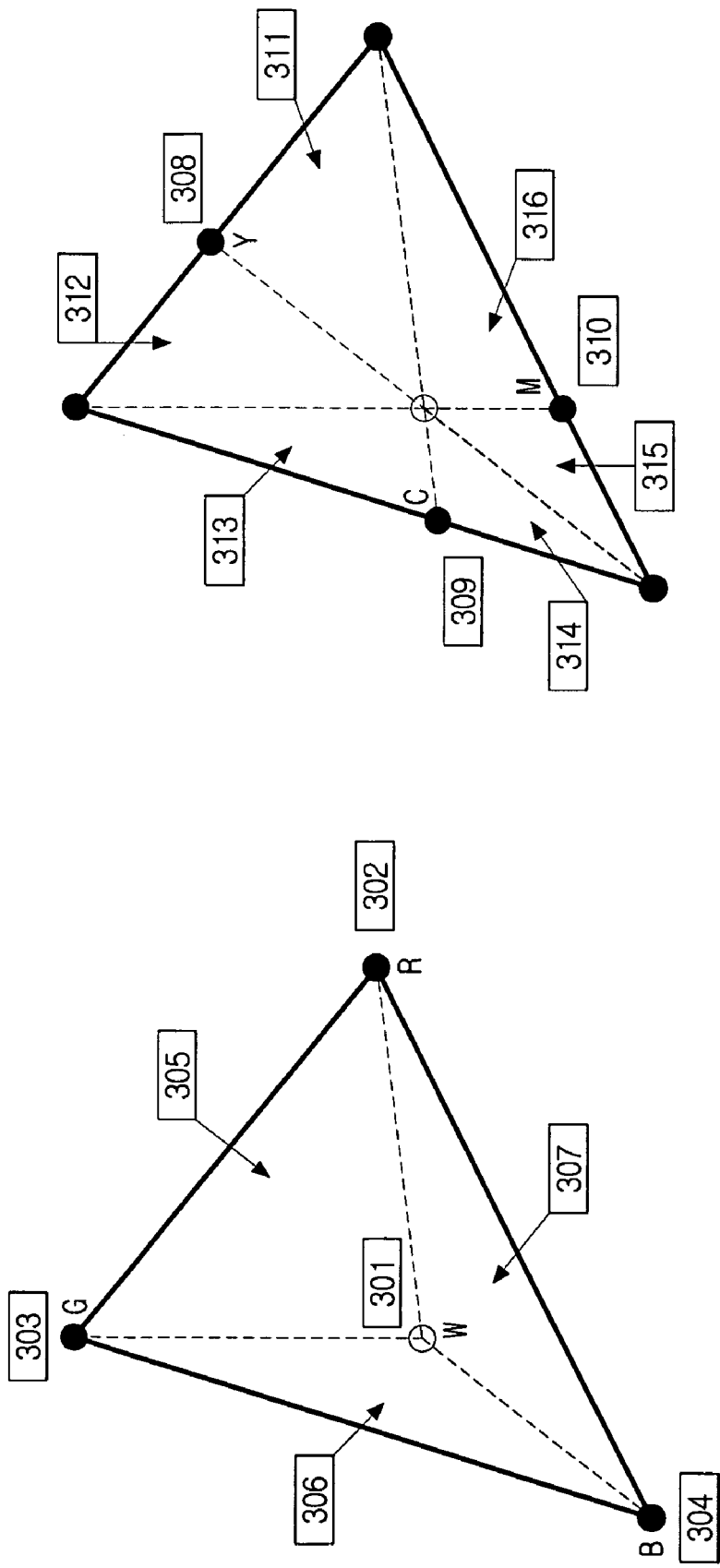
FIG. 3A is a view illustrating three-channel-area division and six-channel-area division.
Figure 3B:
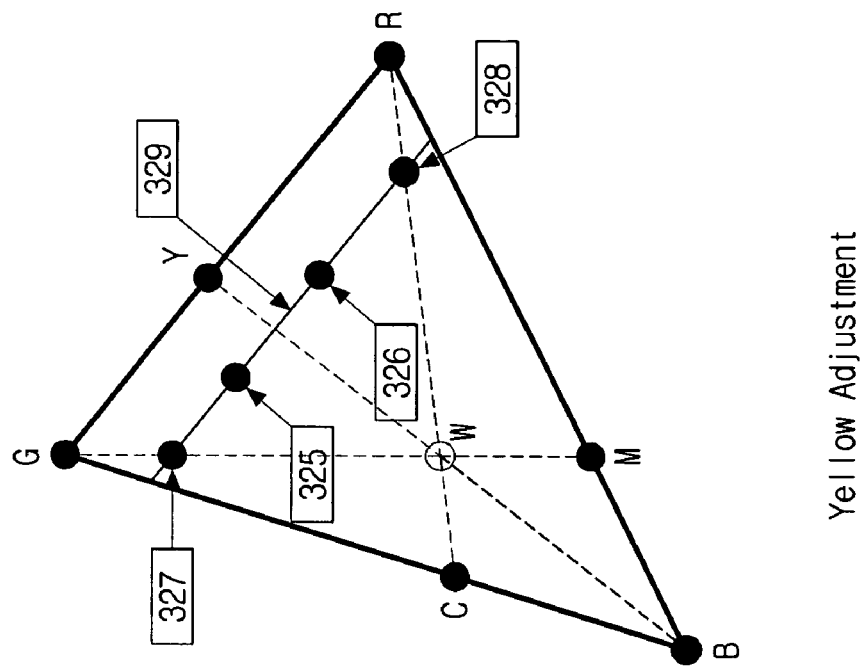
FIG. 3B is a view illustrating CYM color adjustment.
Figure 3B:
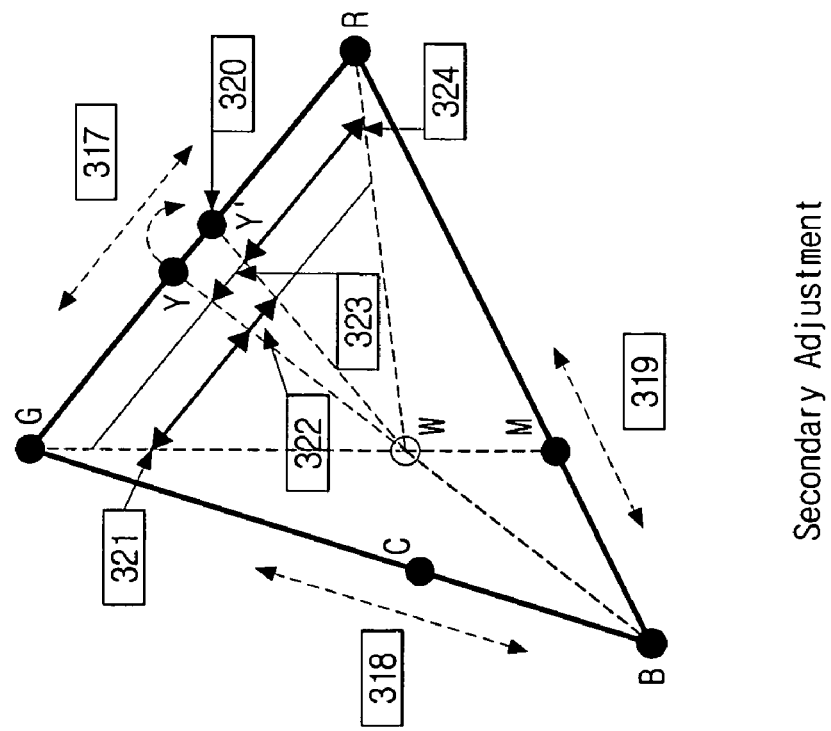

FIG. 3A illustrates a three-channel region division and a six-channel region division.

Referring to FIG. 3A, points 301, 302, 303, 304 indicates locations of white (W), red (R), green (G), and blue (B) of the device in the CIE-xyY coordinates, respectively, and have values (xw, yw), (xr, yr), (xg, yg) and (xb, yb), respectively. Since all the values are white-offset, the white point value (xw, yw) is (0,0). The region 305 indicates a RG region comprised of ΔWRG, the region 306 indicates a GB region comprised of ΔWGB, and the region 307 indicates a BR region comprised of ΔWBR. A region index 'iRegion' for the current value (wx, wy) is set based on the following Equation 5:

if (wx, wy) is on ΔWBG iRegion=0 else if (wx, wy) is on ΔWGB iRegion=1 else iRegion=2     [Equation 5]

A process of the equation 5 is obtained using a linear property. If a certain point of the RGB region section of FIG. 3A is located in the RG region, the certain point is located above the straight line WR and on the right of the straight line WG, that is, below the straight line GR. A region where the certain point is located is obtained based on the following Equation 6 using the linear property:

c0=yr*wx−xr*wy;

c1=yg*wx−xg*wy;

c2=yb*wx−xb*wy;

if(c2,<=0&& c3>0) iRegion=0;

else if (c3<=0&& c4>0) iRegion=1;

else iRegion=2;     [Equation 6]

Points 308, 309, 310 of FIG. 3A indicate locations of Y, C, M in the CIE-xy coordinates and have values (xy, yy), (xc, yc) and (xm, ym). The values (xy, yy), (xc, yc) and (xm, ym) are white-offset. Accordingly, the region 311 indicates a YR region comprised of ΔWYR, the region 312 indicates a YG region comprised of ΔWYG, the region 313 indicates a CG region comprised of ΔWCG, the region 314 indicates a CB region comprised of ΔWCB, the region 315 indicates a MB region comprised of ΔWMB, and the region 316 indicates a MR region comprised of ΔWMR. The selection of regions is set based on the following Equation 7.

if iRegion is 0 begin if (wx, wy) is on ΔWYR iSRegion=0 else iSRegion=1 end else if iRegion is 1 begin if (wx, wy) is on ΔWCG iSRegion=0 else iSRegion=1

```
            end else if iRegion is 2 begin if (wx, wy) is on ΔWMB iSRegion=0 else iSRegion=1 end                                    [Equation 7]
```

Also, a secondary region is set based on the above-described Equation 7 or alternatively based on the following Equation 8:

```
    if(iRegion==0)a=yy, b=-xy;

else if(index_region==1)a=cy, b=-cx;

else a=my, b=-mx;

pos=a*wx+b*wy;

if(b<0)pos=-pos;

if(pos<=0) iSRegion=0;

else iSRegion=1;                              [Equation 8]
``` wherein, in case of yellow, cyan, magenta, it is necessary to take into account the fact that the position of 'x' changes depending on if it is a positive number or a negative number.

FIG. 3B illustrates a CMY adjustment.

In FIG. 3B, the dashed arrow line 317 indicates an amendment to Y, which exists in the line RG and moves in the direction of R or G. The dashed arrow line 318 indicates an amendment to C, which exists in the line GB and moves in the direction of G or B. The dashed arrow line 319 indicates an amendment to M, which exists in the line BR and moves in the direction of B or R. The point 320 is a result when the Y moves in the direction R. If the point 320 is defined by Y', all colors within the area 321 in ΔWYG increase to ΔWY'G with reference to the point G as much as is shown by 322, and all colors within the area 323 in ΔWYR decrease to ΔWY'R with reference to the point R as much as is shown by 324. Accordingly, even if a color temperature of the display increases, yellow is prevented from moving toward green such that a face color of person is amended to be more unnatural, and even if a color temperature decreases, cyan is prevented from moving toward green and thus sky blue color is prevented from moving toward green such that unnatural color reproduction can be prevented.

In FIG. 3B, if the point 325 is P(px, py) and the point 326 is Q(qx, qy), the points P, Q move in the direction of R along the straight line 329 when the Y moves in the direction of R. The straight line 329 is in parallel to the line RG and passes through the points P, Q. Therefore, the point Q within the ΔWYR decreases with reference to the point 328 where the straight line 329 and the straight line WR intersect, whereas the point P within the ΔWYG increases towards the point 328 with reference to the point 328 wherein the straight line 329 and the straight line WG intersect. If the points 327 and 328 are (rgx, rgy), (rrx, rry) as reference points, the point P(px, py) is iRegion=0 and iSRegion=1 and thus the point P(px, py) moves toward a new point (new_px, new_py) red based on the following Equation 9:

$$texmp\_x = px - rgx;$$

$$temp\_y = py - rgy;$$

$$new\_px = rgx + temp\_x * yello\_gain1;$$

$$new\_py = rgy + temp\_y * yellow\_gain1; \quad \text{[Equation 9]}$$

Also, the point Q(qx, qy) is iRegion=0 and iSRegion=0, the point Q(qx, qy) moves toward a new point (new_qx, new_qy) red based on the following Equation 10:

$$temp\_x = qx - rgx;$$

$$temp\_y = qy - rgy;$$

$$new\_qx = rrx + temp\_x * yellow\_gain2;$$

$$new\_qy = rry + temp\_y * yellow\_gain2; \quad \text{[Equation 10]}$$

The yellow_gain1 is calculated based on the following Equation 11 and the yellow_gain2 is calculated based on the following equation 12. In the following Equations 11 and 12, rRYG denotes an adjustment amount and has a range of [−0.5, 0.5]. If the rRYG is a negative number, yellow is amended to red, if the rRYG is a positive number, yellow is amended to green.

$$yellow\_gain1 = \begin{cases} 1 - rRYG, & rRYG \geq 0 \\ 1 - rRYG \cdot \frac{RY}{YG}, & rRYG < 0 \end{cases} \quad \text{[Equation 11]}$$

$$yellow\_gain2 = \begin{cases} 1 + rRYG, & rRYG < 0 \\ 1 + rRYG \cdot \frac{YG}{RY}, & rRYG \geq 0 \end{cases} \quad \text{[Equation 12]}$$

where RY denotes a distance between red and yellow and YG denotes a distance between yellow and green.

The cyan and magenta are processed in the same method as in the case of yellow. Accordingly, even if a color temperature of the display increases, an unnatural color reproduction, for example, an unnatural face color caused by the movement of yellow toward green can be prevented, and also, even if a color temperature decreases, an unnatural color reproduction caused by the movement of cyan toward green and the movement of sky blue color toward green can be prevented.

Referring back to FIG. 6, the color gamut boundary point calculator 606 searches for a color gamut boundary point with respect to the source device of the current (wx, wy). Detail operation will now be described with reference to FIG. 4.

Figure 4:
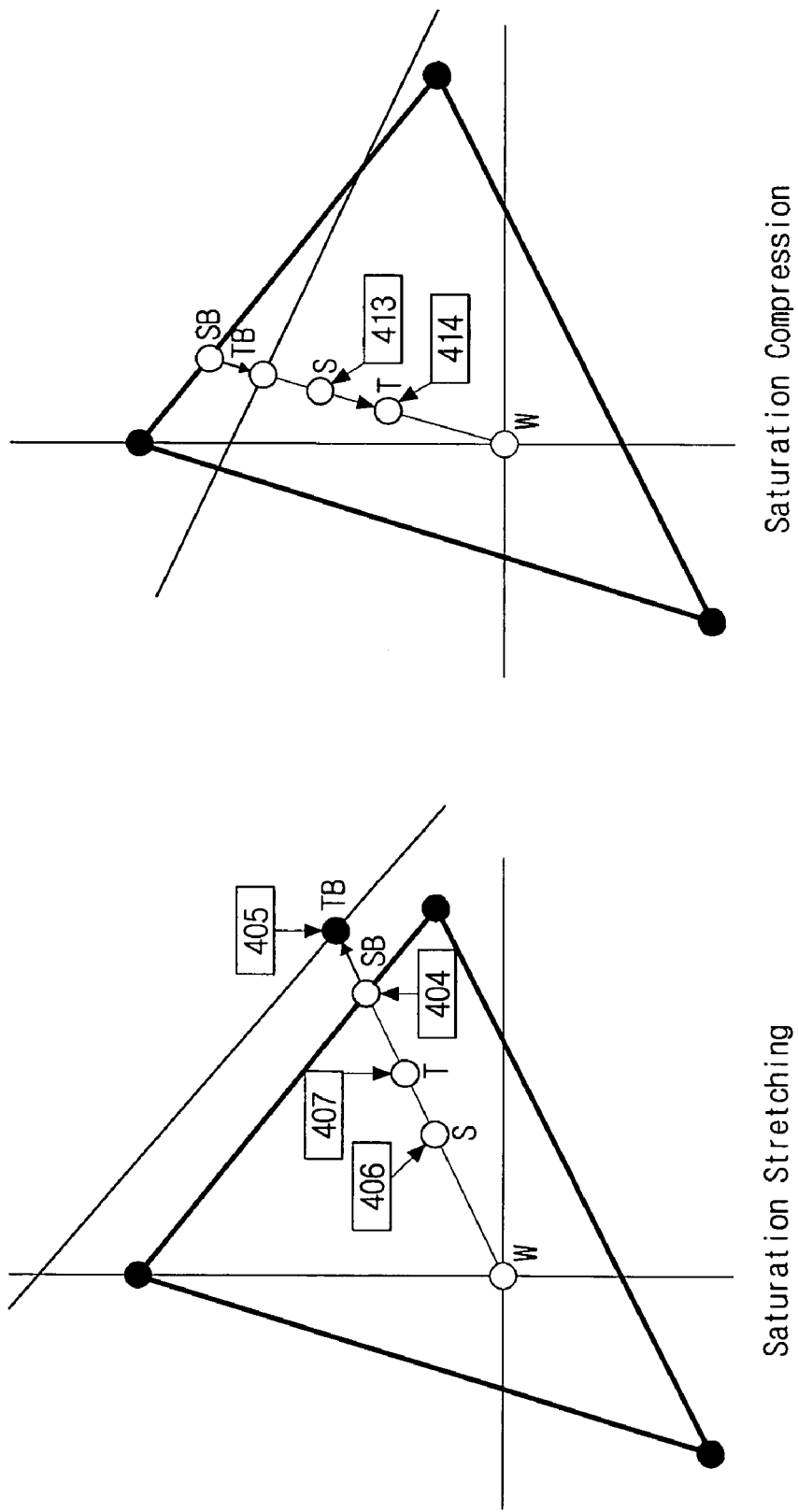
FIG. 4 is a view illustrating a saturation mapping based on a color gamut boundary point according to an exemplary embodiment of the present invention.

FIG. 4 is a view illustrating a saturation mapping based on a color gamut boundary point according to an exemplary embodiment of the present invention. As shown in FIG. 4, if a target color gamut is larger than a source color gamut, a saturation stretching is performed, and if a target color gamut is smaller than a source color gamut, a saturation compression is performed.

If a source saturation S is a current point 406, a color gamut boundary point 404 is obtained by a cross point of a straight line WS and a straight line RG of a source device since the current point 406 is within the RG region of the source device.

As shown in FIG. 4, a saturation stretching is performed such that the source saturation S at the point 406 becomes a target saturation T at a point 407.

If the points 405 and 406 are (sbpx, sbpy) and (tbpx, tbpy) and a mapping point 407 is (tx, ty), a mapping point is obtained based on the following Equation 13:

$$tx = gsat \cdot wx \quad ty = gsat \cdot wy \qquad \text{[Equation 13]}$$

The gsat is obtained based on the following Equation 14:

$$gsat = \frac{\sqrt{tbpx^2 + tbpy^2}}{\sqrt{sbpx^2 + sbpy^2}} \qquad \text{[Equation 14]}$$

where the gsat is greater than 1.

The point 413 is mapped to the point 414 according to the saturation compression. In this case, the gsat of theEequation 14 has a value less than 1.

Figure 7A:
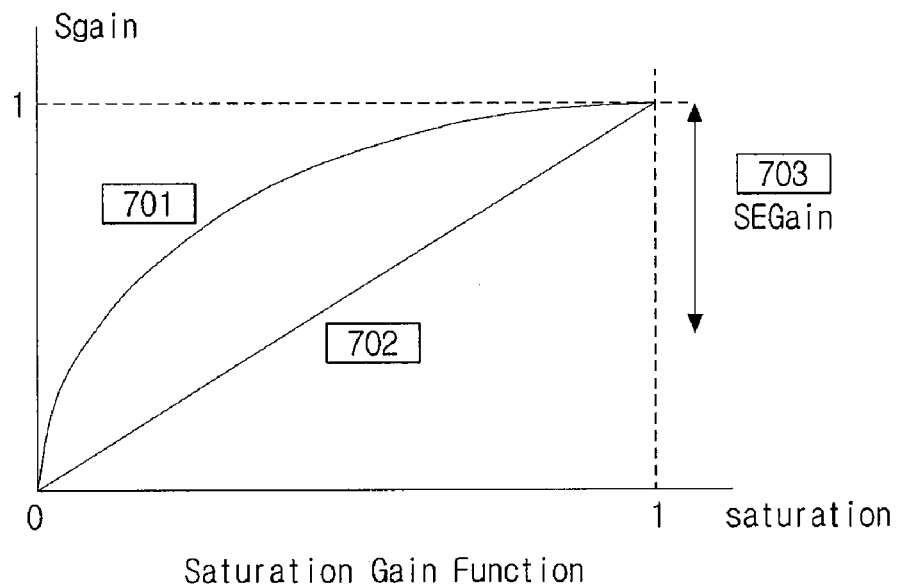
FIGS. 7A and 7B are views showing gain functions using linear function and nonlinear functions.

However, the saturation stretching may result in a side effect that extremely increases saturation of a low-saturation color and thus makes it unnatural, and the saturation compression may result in a side effect that decreases saturation of a mid-level saturation color. Accordingly, a method for mitigating the side effects by adjusting an amount of gain of the low-saturation and the mid-level-saturation colors is needed. FIG. 7A illustrates a saturation gain function. Referring to FIG. 7A, if the saturation is low, a gain is decreased, and if the saturation is high, the gain is increased. The smooth curve 701 represents a nonlinear function and the straight line 702 represents a linear function. The arrow 703 indicates an adjustment to the total gain of the function. The gain function is as follows:

$$SGain = S^{\gamma} \times SEGain \qquad \text{[Equation 15]}$$

The saturation S is obtained based on the following Equation 16:

$$S = \frac{\sqrt{wx^2 + wy^2}}{\sqrt{sbpx^2 + sbpy^2}} \qquad \text{[Equation 16]}$$

In equation 15, γ ranges from 0 to 1. The gain function may use another function. Accordingly, the gsat of the Equation 14 is re-written as the following Equation 17.

$$\alpha = 1 - \frac{\sqrt{tbpx^2 + tbpy^2}}{\sqrt{sbpx^2 + sbpy^2}} \qquad \text{[Equation 17]}$$

$$gsat = 1 + \alpha \times SGain$$

Referring back to FIG. 6, the second composition unit 610 adds a coordinates value (xw, yw) of white to the white-offset value (wx, wy), thereby converting it into the CIE-xy. The luminance mapping unit 611 performs a luminance mapping. The luminance mapping will now be described with reference to FIG. 5.

Figure 5:
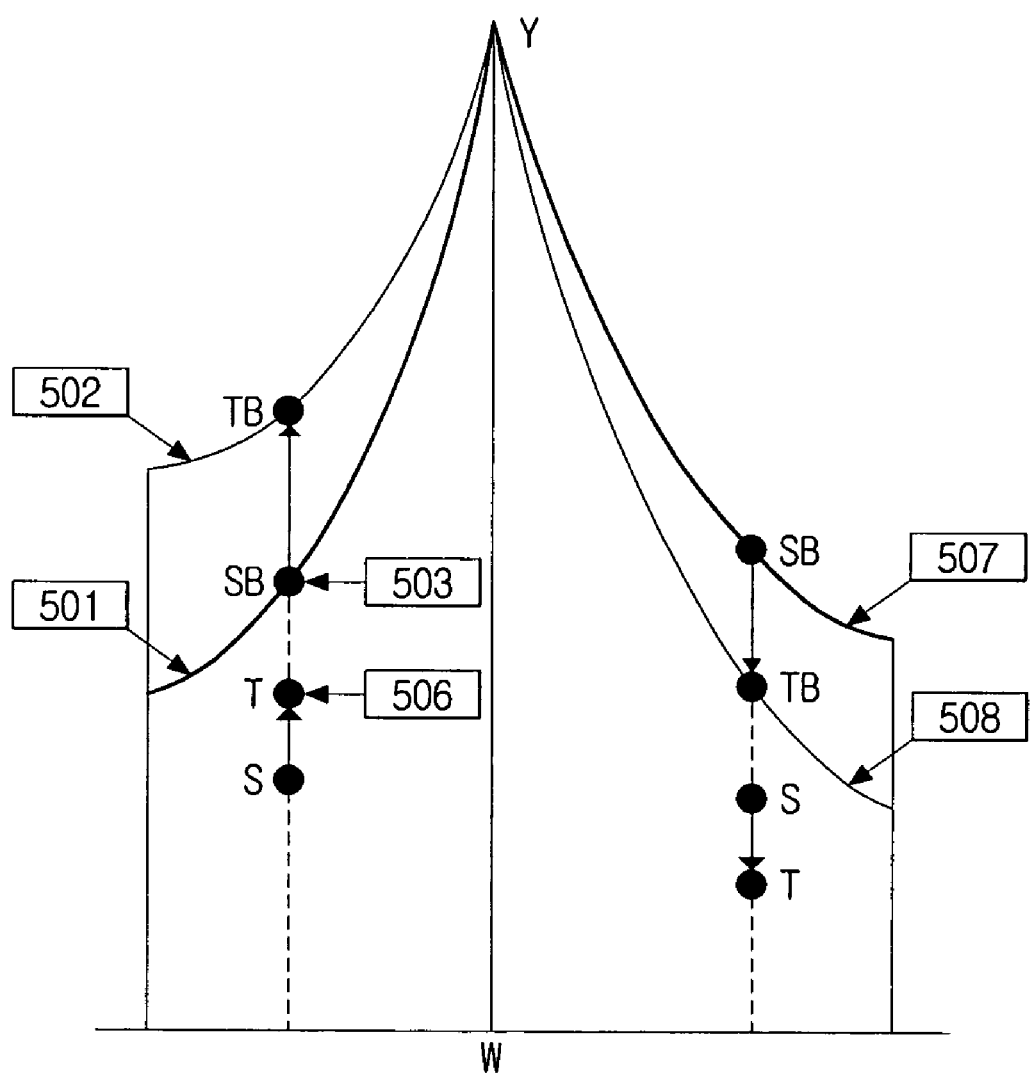
FIG. 5 is a view showing a luminance mapping according to an exemplary embodiment of the present invention.

FIG. 5 illustrates a luminance mapping according to an exemplary embodiment of the present invention. In FIG. 5, the curves 501 and 507 denote a luminance gamut boundary of a source device, and the curves 502 and 508 denotes a luminance gamut boundary of a target device. On the left of FIG. 5, the target luminance is higher than the source luminance and thus the luminance needs to be stretched, and on the right, the luminance needs to be compressed. The luminance boundary 503 $Y_{SB}$ of the source device is calculated with the input signal RLGLBL color signal based on the following Equation 18:

$$V = \max(R_L, G_L, B_L) \qquad \text{[Equation 18]}$$

$$Y_{SE} = \frac{Y}{V}$$

Accordingly, RGB values of the finally mapped point 506 are calculated based on the following Equation 19:

$$R = glum \times R_T$$
$$G = glum \times G_T$$
$$B = glum \times B_T \qquad \text{[Equation 19]}$$

The glum is obtained based on the following Equation 20:

$$glum = \frac{Y_{TB}}{Y_{SB}} \qquad \text{[Equation 20]}$$

Figure 7B:
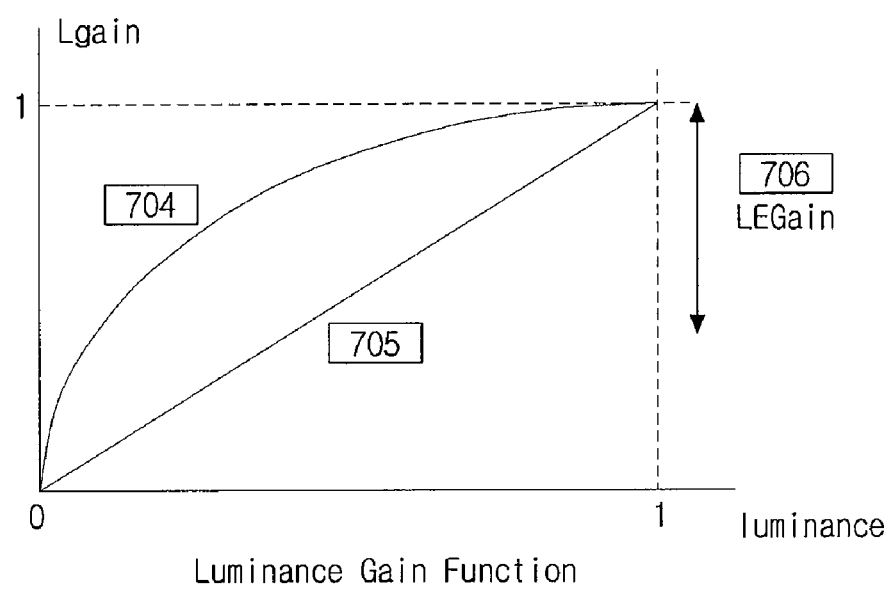

However, the luminance stretching may result a side effect that increases low luminance colors and thus increases a noise, and the luminance compression may results in a side effect that decreases the luminance of mid-level luminance colors and thus decreases the total luminance. Accordingly, a method for mitigating the side effects by adjusting an amount of gain of the low-luminance and the mid-level luminance colors is needed. Accordingly, as shown in FIG. 7B, if a luminance is low, its gain is decreased, and if a luminance is high, its gain is increased. At this time, the gain adjustment may use a nonlinear function like the function 704 or a linear function like the function 705. The arrow 706 indicates an adjustment to the total gain of the function. The gain function is as the following Equation 21:

$$LGain = L^{\gamma} \times LEGain \qquad \text{[Equation 21]}$$

where L denotes a relative luminance and is obtained based on the following Equation 22:

$$L = \frac{Y}{Y_{SB}} \qquad \text{[Equation 22]}$$

γ of equation 21 has a rage of [0-1]. The gain function may use another function. Accordingly, the glum of the equation 21 is re-written as the following Equation 23:

$$\alpha = 1 - \frac{Y_{TB}}{Y_{SB}} \qquad \text{[Equation 23]}$$

$$glum = 1 + \alpha \times LGain$$

Referring back to FIG. 6, the luminance mapping unit 611 selects a gamut mapping or a standard color reproduction in an input mode. The standard color reproduction accurately represents the color of overlapped portion of the source gamut and the target gamut, and if the source gamut is larger than the target gamut, clips a boundary of the source gamut into a boundary of the target gamut, and does not use the remaining portion of the target gamut. Accordingly, the target device can represent an original color of the source device. The standard color reproduction is calculated with the XYZ values input to the luminance mapping unit 611 according to the conversion matrix of the target device of the following Equation 24:

$$\begin{bmatrix} R_T \\ G_T \\ B_T \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} X \\ Y \\ Z \end{bmatrix} \quad \text{[Equation 24]}$$

The output values $R_T$, $G_T$, $B_T$ are limited to [0-1]. The output value has a range of the following Equation 25:

$$R_L = \begin{cases} 0, & R_T < 0 \\ 1, & R_T > 1 \\ R_T & \text{else} \end{cases} \quad \text{[Equation 25]}$$

The output values $G_L$, $B_L$ are the same as above.

According to the exemplary embodiment of the present invention as described above, it is possible to reduce color reproduction distortion of an image between different color devices having different color gamuts and also reproduce a natural color image, and also, secondary CMY colors, which vary depending on a color temperature, can be adjusted to be more natural. Also, since the color gamut boundary can be easily obtained, a memory capacity can be saved compared to the conventional method using a lookup table and also a freedom of algorithm can be increased.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An intelligent color gamut management method which converts a nonlinear color signal from a source device into a linear color signal that is reproducible by a target device, the method comprising:
   (a) converting the linear color signal into an xy color signal of an XYZ color space;
   (b) dividing a color signal region with respect to the xy color signal and calculating a color gamut boundary point;
   (c) performing a saturation mapping based on the color gamut boundary point;
   (d) performing a luminance mapping based on the linear color signal and the xy color signal, and
   adjusting an amount of gain in order to prevent a saturation of a low saturation color from being extremely increased and being unnatural due to a saturation stretching, and adjusting an amount of gain in order to prevent a saturation of a mid-level saturation color from being decreased due to a saturation compression.

2. The intelligent color gamut management method as claimed in claim 1, wherein the operation (a) converts the linear color signal into a color signal of a device independent coordinates CIE-XYZ using a 3×3 matrix, and converts the color signal of the CIE-XYZ coordinates into the xy color signal.

3. The intelligent color gamut management method as claimed in claim 1, wherein the operation (b) divides the CIE-xy coordinates into three-channel regions including a white (W) region, a red (R) region, a green (G) region and a blue (B) region.

4. The intelligent color gamut management method as claimed in claim 1, wherein the operation (b) calculates a source color gamut boundary point (sbpx, sbpy) and a target color gamut boundary point (tbpx, tbpy).

5. The intelligent color gamut management method as claimed in claim 1, wherein the operation (c) performs the saturation stretching if a target color gamut is larger than a source color gamut, and performs the saturation compression if the target color gamut is smaller than the source color gamut.

6. The intelligent color gamut management method as claimed in claim 5, wherein the operation of adjusting the amount of gain uses a nonlinear function or a linear function, and decreases the gain if the saturation is low and increases the gain if the saturation is high.

7. The intelligent color gamut management method as claimed in claim 5, wherein the operation of adjusting an amount of gain adjusts saturations of secondary colors including yellow, cyan and magenta.

8. The intelligent color gamut management method as claimed in claim 1, wherein the operation (c) obtains a mapping point (tx, ty) based on the following Equation:

$$tx = gsat * wx, \quad ty = gsat * wy$$

$$gsat = \frac{\sqrt{tbpx^2 + tbpy^2}}{\sqrt{sbpx^2 + sbpy^2}}$$

where wx, wy are obtained by subtracting a white point from the xy color signal and gsat>1.

9. The intelligent color gamut management method as claimed in claim 1, wherein, at the operation of (d), the luminance mapping comprises a luminance stretching if a luminance of a target color gamut is higher than that of a source color gamut and performs a luminance compression if the luminance of the source color gamut is higher than that of the target color gamut.

10. The intelligent color gamut management method as claimed in claim 9, further comprising adjusting an amount of gain when the amount of low luminance colors is increased and thus a noise is increased due to the luminance stretching or when a luminance of mid-level luminance colors is decreased due to the luminance compression.

11. The intelligent color gamut management method as claimed in claim 10, wherein if the luminance is low, the amount of gain is reduced, and if the luminance is high, the amount of gain is increased.

12. The intelligent color gamut management method as claimed in claim 10, wherein at the operation of adjusting, luminance of secondary colors including yellow, cyan, magenta are adjusted.

13. The intelligent color gamut management method as claimed in claim 1, wherein the operations of (c) and (d) are performed with reference to a white point.

14. The intelligent color gamut management method as claimed in claim 1, wherein the operation (b) divides the CIE-xy coordinates into six-channel regions including a white (W) region, a red (R) region, a green (G) region, a blue (B) region, a yellow (Y) region, a cyan (C) region and a magenta (M) region.

15. An intelligent color gamut management method which converts a nonlinear color signal from a source device into a linear color signal that is reproducible by a target device, the method comprising:
(a) converting the linear color signal into an xy color signal of an XYZ color space;
(b) dividing a color signal region with respect to the xy color signal and calculating a color gamut boundary point;
(c) performing a saturation mapping based on the color gamut boundary point;
(d) performing a luminance mapping based on the linear color signal and the xy color signal and
adjusting an amount of gain when an amount of low luminance colors is increased and thus a noise is increased due to the luminance stretching or when a luminance of mid-level luminance colors is decreased due to the luminance compression.

* * * * *